(12) United States Patent
Kokkelink et al.

(10) Patent No.: US 7,280,734 B2
(45) Date of Patent: Oct. 9, 2007

(54) EXPANDING SINGLE MODE FIBER MODE FIELD FOR HIGH POWER APPLICATIONS BY FUSION WITH MULTIMODE FIBER

(75) Inventors: Jan W. Kokkelink, Blairstown, NJ (US); Talal K. Findakly, Hackettstown, NJ (US)

(73) Assignee: Micro Optics, Inc., Hackettstown, NJ (US)

( * ) Notice: Subject to any disclaimer, the term of this patent is extended or adjusted under 35 U.S.C. 154(b) by 0 days.

(21) Appl. No.: 11/202,568

(22) Filed: Aug. 12, 2005

(65) Prior Publication Data

US 2006/0051027 A1    Mar. 9, 2006

Related U.S. Application Data

(60) Provisional application No. 60/608,283, filed on Sep. 9, 2004.

(51) Int. Cl.
G02B 6/00 (2006.01)
G02B 6/02 (2006.01)
G02B 6/16 (2006.01)

(52) U.S. Cl. ............... 385/140; 385/123; 385/126; 385/31; 385/38; 385/39

(58) Field of Classification Search ............... 385/140
See application file for complete search history.

(56) References Cited

U.S. PATENT DOCUMENTS

| 4,701,011 | A | * | 10/1987 | Emkey et al. | 385/34 |
| 4,712,306 | A | * | 12/1987 | Cahill et al. | 33/304 |
| 4,804,248 | A | * | 2/1989 | Bhagavatula | 385/28 |
| 4,834,493 | A | * | 5/1989 | Cahill et al. | 385/77 |
| 5,077,815 | A | * | 12/1991 | Yoshizawa et al. | 385/28 |
| 5,095,519 | A | * | 3/1992 | Dorsey | 385/140 |
| 5,325,456 | A | * | 6/1994 | Cullen et al. | 385/138 |
| 5,384,874 | A | * | 1/1995 | Hirai et al. | 385/34 |
| 5,457,759 | A | * | 10/1995 | Kalonji et al. | 385/31 |
| 5,477,323 | A | * | 12/1995 | Andrews et al. | 356/477 |
| 5,627,642 | A | * | 5/1997 | Dhadwal et al. | 356/336 |
| 5,815,611 | A | * | 9/1998 | Dhadwal | 385/12 |
| 5,940,554 | A | * | 8/1999 | Chang et al. | 385/22 |
| 6,014,483 | A | * | 1/2000 | Thual et al. | 385/33 |
| 6,275,514 | B1 | * | 8/2001 | Katzir et al. | 372/25 |
| 6,324,319 | B1 | * | 11/2001 | Tselikov et al. | 385/28 |
| 6,324,326 | B1 | * | 11/2001 | Dejneka et al. | 385/123 |
| 6,330,382 | B1 | * | 12/2001 | Harshbarger et al. | 385/28 |
| 6,349,162 | B1 | * | 2/2002 | Shiraishi et al. | 385/124 |
| 6,415,076 | B1 | * | 7/2002 | DeCusatis | 385/28 |

(Continued)

*Primary Examiner*—Frank G. Font
*Assistant Examiner*—Ryan Lepisto
(74) *Attorney, Agent, or Firm*—Michael W. Ferrell

(57) ABSTRACT

Apparatus and methodology for the low coupling of optical fibers in high power applications. An end of a single mode optical fiber, or a polarization maintaining fiber, is cut and spliced to a relatively short segment of an index matched multi-mode fiber or an optical fiber without cladding (air cladded) having approximately similar diameter as the single mode fiber which in turn is coupled to the external device. The free end of the multi-mode fiber may be cleaved, polished and have an anti-reflection applied to it. The beam emitted by the small core of the single mode optical fiber expands into the larger core of the multi-mode fiber providing low loss high power coupling of the optical fiber to the external device.

22 Claims, 1 Drawing Sheet

U.S. PATENT DOCUMENTS

| | | | |
|---|---|---|---|
| 6,496,265 B1 * | 12/2002 | Duncan et al. | 356/479 |
| 6,542,665 B2 * | 4/2003 | Reed et al. | 385/34 |
| 6,643,428 B2 * | 11/2003 | Chang | 385/33 |
| 6,718,281 B2 * | 4/2004 | Duncan et al. | 702/159 |
| 6,751,369 B1 * | 6/2004 | Lewis | 385/18 |
| 6,873,768 B2 * | 3/2005 | Duelli et al. | 385/50 |
| 2001/0017971 A1 * | 8/2001 | Iwata et al. | 385/139 |
| 2002/0191911 A1 * | 12/2002 | Ukrainczyk et al. | 385/33 |
| 2003/0133654 A1 * | 7/2003 | Chang | 385/34 |
| 2003/0185269 A1 * | 10/2003 | Gutin | 372/108 |
| 2004/0151466 A1 * | 8/2004 | Crossman-Bosworth et al. | 385/140 |
| 2004/0218870 A1 * | 11/2004 | Blauvelt et al. | 385/50 |
| 2005/0220401 A1 * | 10/2005 | Jiang et al. | 385/28 |

* cited by examiner

EXPANDING SINGLE MODE FIBER MODE FIELD FOR HIGH POWER APPLICATIONS BY FUSION WITH MULTIMODE FIBER

REFERENCE TO RELATED APPLICATIONS

This application claims priority of U.S. Provisional application No. 60/608,283 filed Sep. 9, 2004.

BACKGROUND OF THE INVENTION

This application relates to optical fibers, and more specifically to apparatus and methodology for the efficient coupling of optical fibers in high power applications.

High power performance of fiber lasers and fiber amplifiers is increasingly being required for a wide variety of applications and operating optical powers have increased enormously in recent years. Components used in these products are generally based on passive micro-optical parts assembled by attaching optical fibers (polarization maintaining fibers or single mode fibers) to them through input and output lenses. Such components, originally designed for low power applications (typically in the mW range), are now required to operate at powers ranging from several watts to kW levels. These components are not designed for, and cannot reliably operate at, such high optical intensities. Many of the passive optical components used in these products require polished fiber ends, radiating into the air directly from the polished (or cleaved) fiber tip, through an anti-reflection (AR) coating directly deposited on the polished (or cleaved) fiber tip, or using an anti-reflection coated plate epoxied on the fiber tip (by way of example: a glass plate, previously anti-reflection coated, mounted to the end of the fiber with an index matching epoxy).

At these fiber tip junctions, the optical intensities are at their highest (reaching many $GW/cm^2$), easily exceeding the maximum allowable damage levels of the bare fiber tip, the direct anti-reflection coating or anti-reflection plate bonding epoxy. Therefore, these points represent the weakest points in the transmission path and are likely to be damaged with the exposure to high optical power.

At present, there are two ways to reduce the optical intensity at the fiber tips in such situations. Firstly, by fusion splicing the optical fibers directly to the lenses, and secondly by means of locally expanding the fiber core by excessive localized thermal heating. The first solution has the drawback that the lens needs to match the index of the fiber perfectly (to reduce undesirable and problematic back reflections), resulting in limitations in choice of lens and lens performance. The fiber also needs to be placed exactly in the focus of the lens for optimum optical coupling, requiring tight tolerances in lens lengths and fiber to lens positioning. The process is also tedious and not cost effective.

The second solution has the drawback that the area over which the core is being expanded is relatively short, thus requiring great care when polishing or cleaving the fiber end, to avoid shortening the length over which the core is expanded. Shortening the length over which the core is expanded will reduce the size of the expanded beam, resulting in less than optimal reduction of the optical intensity. This process may also not be compatible with polarization maintaining fibers (PMF) because the severe thermal treatment will also deleteriously affect or destroy the internal stress originally induced and frozen into the polarization maintaining fiber thus severely reducing the polarization maintaining properties of the fiber. Furthermore, the fiber cores on both sides of the device need to be matched in mode size, and therefore also in the length over which the core is expanded, in order to optimize optical coupling.

SUMMARY OF THE INVENTION

The present application is directed to apparatus and methodology for the low loss coupling of optical fibers in high power applications. An end of a single mode optical fiber, or a polarization maintaining fiber, is spliced to a relatively short segment of a index matched multi-mode fiber (preferably a step index multi-mode fiber, however a graded index multi-mode fiber may also be used in certain applications) or an optical fiber without cladding (air cladded) having approximately a similar diameter as the single mode fiber which in turn is coupled to an external device through lenses or other coupling mechanisms. The free end of the multi-mode fiber may be cleaved, polished and have an anti-reflection applied to it. The beam emitted by the small core expands in a natural and transparent way into the larger core of the multi-mode fiber providing low loss high power coupling of the optical fiber to the external device.

The approach described in this application reduces the light intensities at the fiber tip considerably as a result of beam expansion within the optical medium and can easily be implemented in existing production lines. Specifically, this approach has the following advantages and features: it substantially reduces the optical density at the fiber tip and does not introduce back reflections, due to the fiber end face, indeed back reflections are actually reduced. Additionally, the present approach is compatible with polarization maintaining fibers and single mode fibers, is easy to implement using widely available tools and inexpensive to incorporate in assembly and production processes.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF THE PREFERRED EMBODIMENTS

Figure 1:
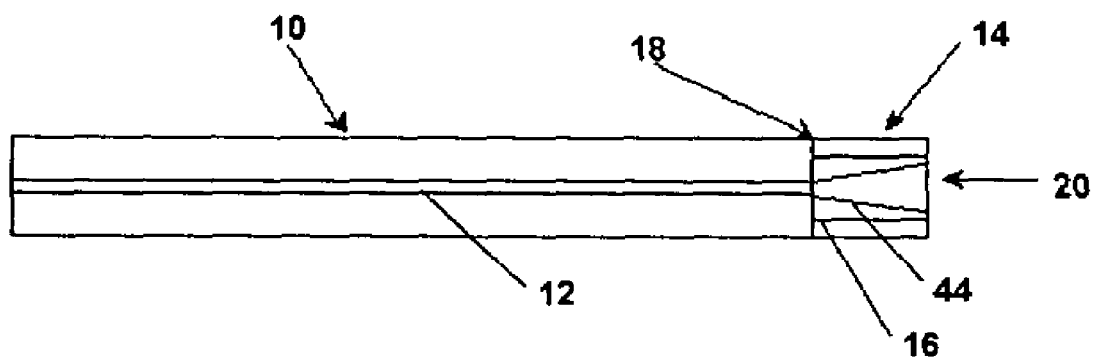
FIG. 1 is a sectional view of the present invention as used with a single mode (SM) optical fiber.

FIG. 1 illustrates the present invention as used with a single mode fiber (SMF) 10 having a relatively small core 12 which is spliced end to end along a splice line 18 to a short length of a Multi-Mode fiber (MMF) 14 having a relatively large core 16, matching in index with the fiber 10, and a polished end 20. Multi-mode fiber 14 is preferably a step index multi-mode fiber, however, in certain applications, a graded index multi-mode fiber may also be used or an optical fiber without cladding (air cladded) having approximately similar diameter as the single mode fiber.

Figure 2:
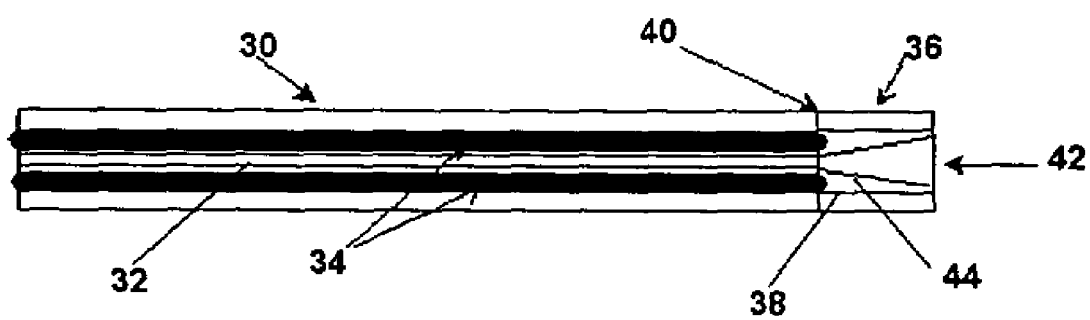
FIG. 2 is a sectional view of the present invention as used with a polarization maintaining (PM) optical fiber.

FIG. 2 illustrates the present invention as used with a Polarization Maintaining fiber (PMF) 30 having a relatively small core 32 and a pair of stress rods 34 which is spliced end to end along a splice line 40 to a short length of a Multi-Mode fiber 36 having a relatively large core 38, and matched in index with the fiber 30 and a polished end 42. Multi-mode fiber 36 is again preferably a step index multi-mode fiber, however, in certain applications, a graded index multi-mode fiber may also be used, or an optical fiber without cladding (air cladded) having approximately similar diameter as the single mode fiber. The splicing of the single mode fiber 10 and Polarization Maintaining fiber 30 to Multi-Mode fiber 14, 36 may be accomplished by standard splicing techniques known in this art, such as by fusion (arc) splicing.

Splicing a Multi-Mode fiber to the end of a Single Mode fiber or a Polarization Maintaining fiber substantially reduces the light intensity at the fiber tip. The reason for this is that the splice point represents continuity between the two fibers (not an abrupt junction like the fiber-to-air junction) as the two fibers have nearly identical material. Therefore, this splice point will be transparent to the optical radiation and no optical damage can take place there. As the optical radiation leaves that point, the beam of the propagating single mode will expand (shown at reference number 44) over the short distance it travels within the multi-mode fiber because the multi-mode fiber has a much larger core. By the time it reaches the multi-mode fiber end, the beam becomes considerably larger (while still in Guassian single mode form) to where the optical density (or intensity) is now much smaller at the weak fiber/air junction. Following this concept, after splicing the two fibers, the fiber is cut (cleaved) a short distance beyond the splice junction on the Multi-Mode fiber side. This new tip is then polished (at the desired angle for the application at hand, either perpendicular to the longitudinal axis of the multi-mode fiber or at an acute angle), and can be anti-reflection coated if desired.

The issues to take into consideration in the design of the fibers of the present invention are: the Multi-Mode fiber core diameter and the length of the Multi-Mode fiber. The design goal is to ensure that the light is not guided by the Multi-Mode fiber but that the fiber mode can expand while staying smaller than the Multi-Mode core. With a proper choice of Multi-Mode fiber the core refractive indices of the Single Mode/Polarization Maintaining fibers can be matched to the Multi-Mode fiber to ensure a minimal reflection from the fiber transition, If the index of the MM fiber does not perfectly match the index of the SM/PM fiber, the reflections from this transition can be minimized by angling the fiber ends before splicing them together. The actual length of the Multi-Mode fiber is quite small, generally less than 1 mm, while the Single Mode or Polarization Maintaining fibers can be of any length required by the task at hand.

In practical application the larger the core of the multi-mode fiber, the more the mode can expand and thus reduce the intensity at the fiber tip. The optimal length of the fiber can be calculated and is determined by how much the mode expands in the index of refraction of the MM fiber, By way of example only, in many applications this will be a length of about 640 µm for 1550 nm wavelength light, for 980 nm wavelength light the fiber length is about 510 µm. Also a fiber without cladding (in other words with a cladding of air) is also suitable for this application.

The advantages of the present design are numerous. For polarization maintaining products, the stress members of the polarization retention properties of the Polarization Maintaining fibers are preserved because they (stress members) are not destructively perturbed. The Polarization Maintaining fibers are visible through the MM fiber; which facilitates fiber alignment during production. The length of MM fiber is not critical; making polishing the fiber tip relatively easy. Angle polishing of the fiber tip, done to reduce back reflections (also referred to as Return Loss), can be reduced. Smaller polish angles can improve optical performance and facilitate fiber to device alignment. The reflection requirements of the Anti Reflection (AR) coating can be lowered due to the presence of a short distance between the Single Mode F/MMF splice point and the end of the MM fiber end which reduces the coupled back reflection by virtue of the expanded beam profile. Also the power handling requirements of the anti-reflection coating will be greatly reduced due to the expanded beam.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method of providing a reduced optical power density terminus to a single mode optical fiber comprising the step of splicing an index matched step index multi-mode fiber segment of a length of less than 1 mm to an end of the single mode fiber, the step index multi-mode optical fiber segment having a core diameter significantly larger than that of the single mode fiber as well as a cleaved flat end forming a terminal end, wherein the length of the step index multi-mode fiber segment and the core diameter thereof are selected such that a light beam of a predetermined wavelength traveling from the single mode optical fiber through the segment is not guided by the segment and expands therein.

2. The method of claim 1, wherein the single mode optical fiber is a polarization maintaining fiber.

3. The method of claim 1, wherein the splicing step comprises fusion splicing.

4. The method of claim 1, further including the step of polishing the terminal end of the step index multi-mode fiber segment.

5. The method of claim 4, further including the step of applying an anti-reflection coating to the polished terminal end of the step index multi-mode fiber segment.

6. An article of manufacture comprising:
 a) a single mode optical fiber;
 b) a step index multi-mode optical fiber segment of a length of less than 1 mm joined to at least one end of the single mode fiber, the step index multi-mode optical fiber segment having a core diameter significantly larger than that of the single mode fiber as well as a cleaved flat end forming a terminal end of the article of manufacture, wherein the length of the step index multi-mode fiber segment and the core diameter thereof are selected such that a light beam of a predetermined wavelength traveling from the single mode optical fiber through the segment is not guided by the segment and expands therein.

7. The article of claim 6, wherein the single mode optical fiber is a polarization maintaining fiber.

8. The article of claim 6, wherein the terminal end of the step index multi-mode fiber includes an anti-reflection coating.

9. The article of claim 8, wherein the step index multi-mode fiber is joined to the single mode optical fiber by fusion.

10. The article of claim 6, wherein the terminal end of the step index multi-mode fiber is polished.

11. The article of claim 6, wherein the terminal end of the step index multi-mode fiber is disposed perpendicular to the longitudinal axis of the multi-mode fiber.

12. The article of claim 6, wherein the step index multi-mode fiber is index matched to the single mode optical fiber.

13. The article of claim 6, wherein the step index multi-mode optical fiber segment comprises an air cladded optical fiber having approximately similar diameter as the single mode fiber.

14. A method of providing a low loss coupling of a single mode optical fiber to an external object comprising the steps of:
   a) cleaving the single mode optical fiber along a plane at a predetermined angle to its optical axis;
   b) splicing a step index multi-mode fiber segment having a core diameter significantly larger than that of the single mode fiber, and having a length of less than 1 mm and also having a cleaved flat free end to the end of the single mode fiber, the step index multi-mode optical fiber segment forming the a terminal end; and
   c) coupling the terminal end of the step index multi-mode fiber segment to the external object, wherein the length of the step index multi-mode fiber segment and the core diameter thereof are selected such that a light beam of a predetermined wavelength traveling from the single mode optical fiber through the segment is not guided by the segment and expands therein.

15. The method of claim 14, wherein the single mode optical fiber is a polarization maintaining fiber.

16. The method of claim 14, wherein the splicing step comprises fusion splicing.

17. The method of claim 14, further including the step of polishing the terminal end of the step index multi-mode fiber segment.

18. The method of claim 17, further including the step of applying an anti-reflection coating to the polished or cleaved end of the step index multi-mode fiber segment.

19. The method of claim 14, wherein the predetermined angle at which the single mode optical fiber is cleaved is 90°.

20. The method of claim 14, wherein the step index multi-mode optical fiber is an air cladded optical fiber.

21. The method of claim 14, further including the step of index matching the step index multi-mode fiber segment to the single mode optical fiber.

22. The method of claim 14, further including the step of angling the step index multi-mode fiber segment with respect to the single mode optical fiber.

\* \* \* \* \*